United States Patent
Lu et al.

(10) Patent No.: US 10,929,408 B2
(45) Date of Patent: Feb. 23, 2021

(54) GENERATING AND ROUTING NOTIFICATIONS OF EXTRACTED EMAIL CONTENT

(71) Applicant: Microsoft Technology Licensing, LLC, Redmond, WA (US)

(72) Inventors: Min Lu, Mountain View, CA (US); Xuan Li, Sunnyvale, CA (US); Weizhen Wang, San Jose, CA (US); Yu Zheng, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 15/134,748

(22) Filed: Apr. 21, 2016

(65) Prior Publication Data
US 2017/0308533 A1  Oct. 26, 2017

(51) Int. Cl.
*G06F 16/00* (2019.01)
*G06F 16/2457* (2019.01)
*H04L 12/58* (2006.01)
*G06F 16/242* (2019.01)

(52) U.S. Cl.
CPC ...... *G06F 16/24578* (2019.01); *G06F 16/243* (2019.01); *G06F 16/24575* (2019.01); *H04L 51/14* (2013.01); *H04L 51/24* (2013.01); *H04L 51/32* (2013.01)

(58) Field of Classification Search
CPC .......... G06F 17/3053; G06F 17/30401; G06F 17/30528; G06F 17/30038; G06F 17/30616; G06F 17/3069; G06F 16/24578; G06F 16/243; G06F 16/24575; G06F 17/2785; G06F 17/30864; H04L 51/22; H04L 51/32; H04L 51/14; H04L 51/24
See application file for complete search history.

(56) References Cited

U.S. PATENT DOCUMENTS

| | | | | |
|---|---|---|---|---|
| 2010/0131523 | A1* | 5/2010 | Yu | G06Q 10/107 707/756 |
| 2013/0290339 | A1* | 10/2013 | LuVogt | G06Q 10/10 707/740 |
| 2014/0046976 | A1* | 2/2014 | Zhang | G06F 16/24553 707/772 |
| 2014/0258198 | A1* | 9/2014 | Spivack | G06N 5/046 706/21 |

(Continued)

*Primary Examiner* — Ashish Thomas
*Assistant Examiner* — Suman Rajaputra
(74) *Attorney, Agent, or Firm* — Schwegman Lundberg & Woessner, P.A.

(57) ABSTRACT

In various example embodiments, a system and method for generating and routing notifications of content extracted from emails are presented. A member's interest in a specific email among a set of emails are determined based on a relevance score. Content from the specific email are extracted, the content being identified as primary information and secondary information. A notification is generated comprising of the vital content extracted from the specific email. Presentation of the primary information is caused, the primary information being associated with the notification according to a ranked order, the ranked order being based on the relevance score. In response to a member action, presentation of the secondary information is caused, the secondary information being associated with the notification.

20 Claims, 7 Drawing Sheets

(56) References Cited

U.S. PATENT DOCUMENTS

| | | | |
|---|---|---|---|
| 2015/0058426 A1* | 2/2015 | Caskey | H04L 51/02 709/206 |
| 2015/0350143 A1* | 12/2015 | Yang | G06F 3/0482 345/173 |
| 2017/0046024 A1* | 2/2017 | Dascola | G06F 3/04845 |

* cited by examiner

GENERATING AND ROUTING NOTIFICATIONS OF EXTRACTED EMAIL CONTENT

TECHNICAL FIELD

Embodiments of the present disclosure relate generally to email and, more particularly, but not by way of limitation, to generating and routing notifications of extracted email content.

BACKGROUND

Communication channels such as email allow social networking service providers to engage directly with each member and facilitate communication between members within a social network themselves. As a result of over communication, an email inbox of a member can overflow with new emails every day resulting in a lowered capacity for each member to individually engage with each email. An overflow of new emails every day lead to members ignoring their email inbox and thus missing all emails by not engaging in active discrimination between important and unimportant emails.

BRIEF DESCRIPTION OF THE DRAWINGS

Various ones of the appended drawings merely illustrate example embodiments of the present disclosure and cannot be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, the features of the present disclosure provide a technical solution to the technical problem of generating a new notification for associated important emails from a plurality of incoming emails, where the important emails are unique to each member according to their member profile and member activity. In an example, from among a plurality of new emails that a member's email inbox receives, the content of the important emails that are determined to be of interest to the user are extracted in order to generate a shortened message. The shortened message containing the minimal information a user would need to access interest is then presented as a notification to the user. The user may indicate for more information associated with the notification. Subsequently, the user may opt to be redirected to the email within the inbox associated with the notification for the full detail of the email. As a result, generating and routing a notification message comprising of vital information of the email content ensures a vital email is not overlooked, especially where a user does not check the email inbox for an extended period of time. Each notification message that is routed is unique to the member since vital information of interest differ from member to member according to their member profile and member activities.

Figure 1:
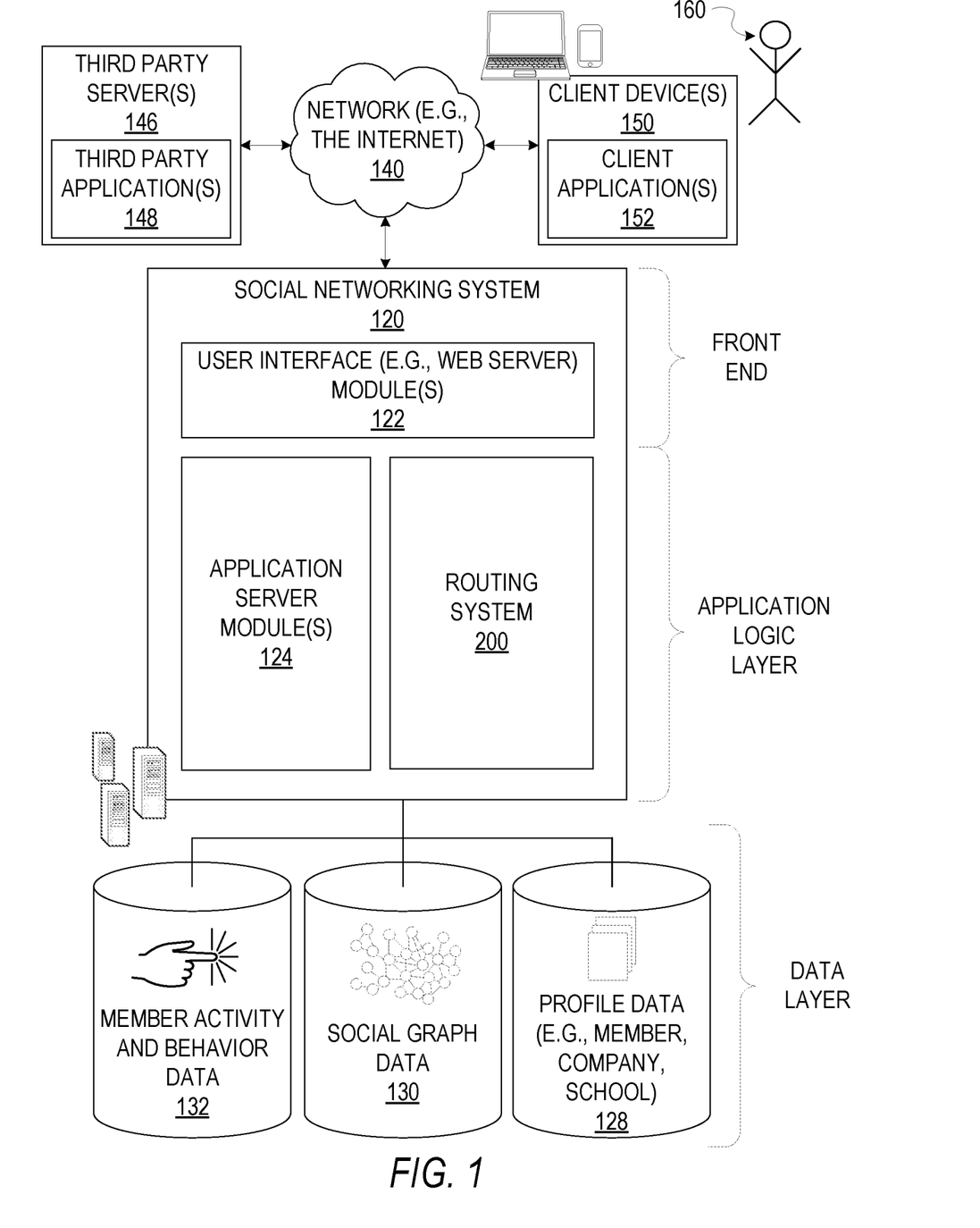
FIG. 1 is a network diagram depicting a client-server system within which various example embodiments may be deployed.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a routing system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
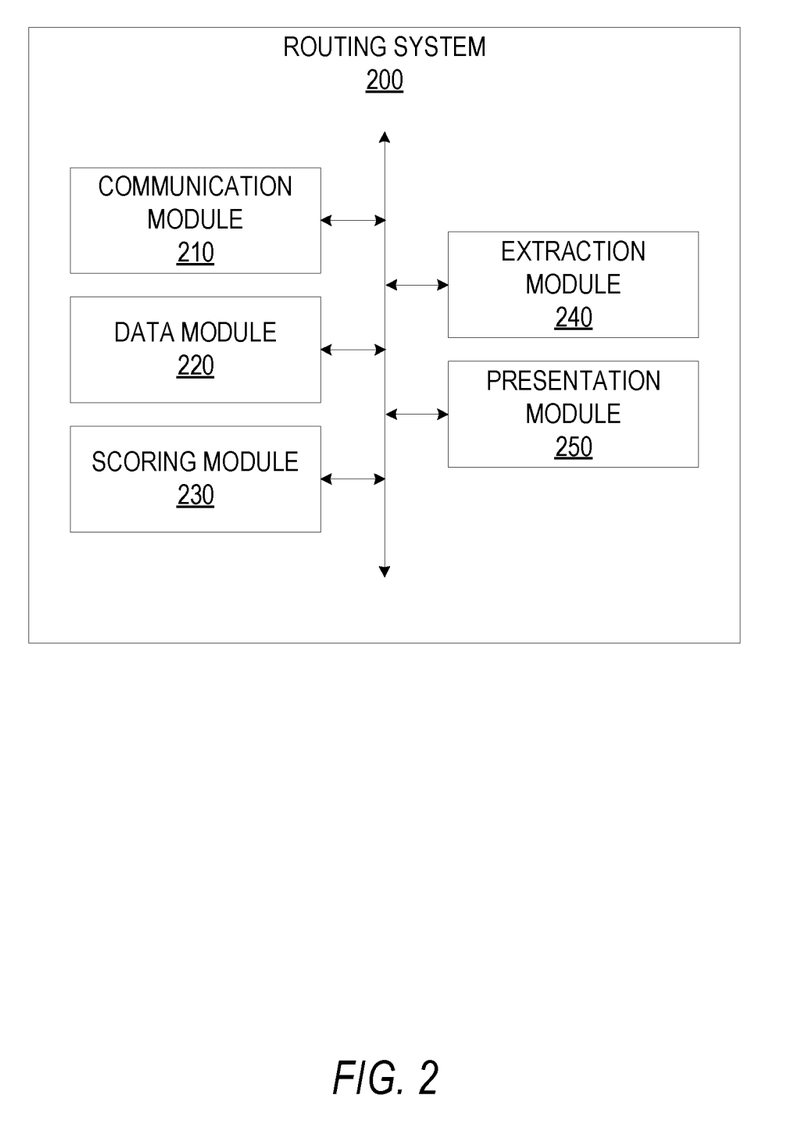
FIG. 2 is a block diagram illustrating an example embodiment of a routing system, according to some example embodiments.

FIG. 2 is a block diagram illustrating components provided within the routing system 200, according to some example embodiments. The routing system 200 includes a communication module 210, a data module 220, a scoring module 230, an extraction module 240, and a presentation module 250. All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example embodiments may also be included, but are not shown.

The communication module 210 is configured to perform various communication functions to facilitate the functionality described herein. For example, the communication module 210 may communicate with the social networking system 120 via the network 140 using a wired or wireless connection. The communication module 210 may also provide various web services functions such as retrieving information from the third party servers 146 and the social networking system 120. In this way, the communication module 210 facilitates the communication between the routing system 200 with the client devices 150 and the third party servers 146 via the network 140. Information retrieved by the communication module 210 may include profile data corresponding to the user 160 and other members of the social network service from the social networking system 120.

The data module 220 is configured to provide various data functionality such as storing and exchanging information with databases or servers. For example, data module 220 may store and access member data from various databases including member activity and behavior data 132, social graph data 130, and profile data 138. Further, the data module 220 may also extract attributes and/or characteristics from the profile data of member profiles. The data module 220 also stores the classification of emails the classification including recruiting emails (e.g., emails sent by recruiters to individual members), endorsement emails (e.g., emails notifying a member that another member has endorsed them), and the like. The classification is indicated within the metadata associated with the email and stored and accessed by the data module 220. Similarly, the data module 220 may access social graph data, member activity and behavior data from respective databases 130 and 132. In some example embodiments, the data module 220 may exchange information with third party servers 146, client devices 150, and other sources of information.

The scoring module 230 is configured to determine that certain emails from among a set of emails within a user's email inbox are important to the specific member and therefore of interest to the member. The determining certain emails are of potential interest is based on member profile information and member activities. In some embodiments, the scoring module 230 determines certain emails are of interest to the member is further based on a relevance score transgressing a threshold, the relevance score being calculated based on a relevance ranking using vector space model comparison between each email within the set of emails and the member profile. As a result, the determination that certain emails within a member email inbox as being important is unique to the member due to the the dependency on the corresponding member profile information and member activities. Details of the generation of a short message from an email are further described in association with FIGS. 5 and 6 below.

The extraction module 240 is configured to extract important content from the emails with an associated score that transgresses a predetermined threshold. The extraction module 240 uses the extracted important content to generate a shortened notification comprising of primary important information and secondary important information determined to be of interest to the user. The shortened notification is representative of a concise message comprising enough information to allow the user to determine if the user would like to engage with the email and the person who sent the email. Details of the generation of a short message from an email are further described in association with FIGS. 5 and 6 below.

In various implementations, the presentation module 250 presents or causes presentation of information (e.g., visually displaying information on a screen, acoustic output, haptic feedback). Interactively presenting information is intended to include the exchange of information between a particular device and the user of that device. In an example, the presentation module 250 is configured to send notifications that include the shortened notification associated with the extracted important email content to the member, presented at a user interface at the client device 150. These notifications can be sent via a notification system as part of the social networking system 120 that sends notifications to specific members in the form of short messages to quickly update the member of activities associated with their profile. The presentation module 250 may further present secondary vital information in response to a member activity indicating further interest with the notification (e.g., tapping, clicking, or hovering over the notification presented). The presentation module 250 can further reroute the member to the corresponding email within the email inbox where the member indicates interest in further viewing the email associated with the notification.

In other embodiments, the presentation module 250 interacts with third party servers 146 and third party applications 148 to cause the generated short message to be presented to the client device 150. For example, the short notifications can be presented via third party servers include text-messaging channels (e.g., SMS messages, MMS, EMS, IM, and so forth), where text-messaging servers associated with SMS causes presentation of the short message to the client device 150. The short notifications can also be presented via push notification or other similar types of notification. The user of the client device 150 may provide input to interact with a user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 250 provides many other user interfaces to facilitate functionality described herein. Further, it will be appreciated that "presenting" as used herein is intended to include communicating information or instructions to a particular device that is operable to perform presentation based on the communicated information or instructions via the communication module 210, data module 220, and scoring module 230, and extraction module 240.

Figure 3:
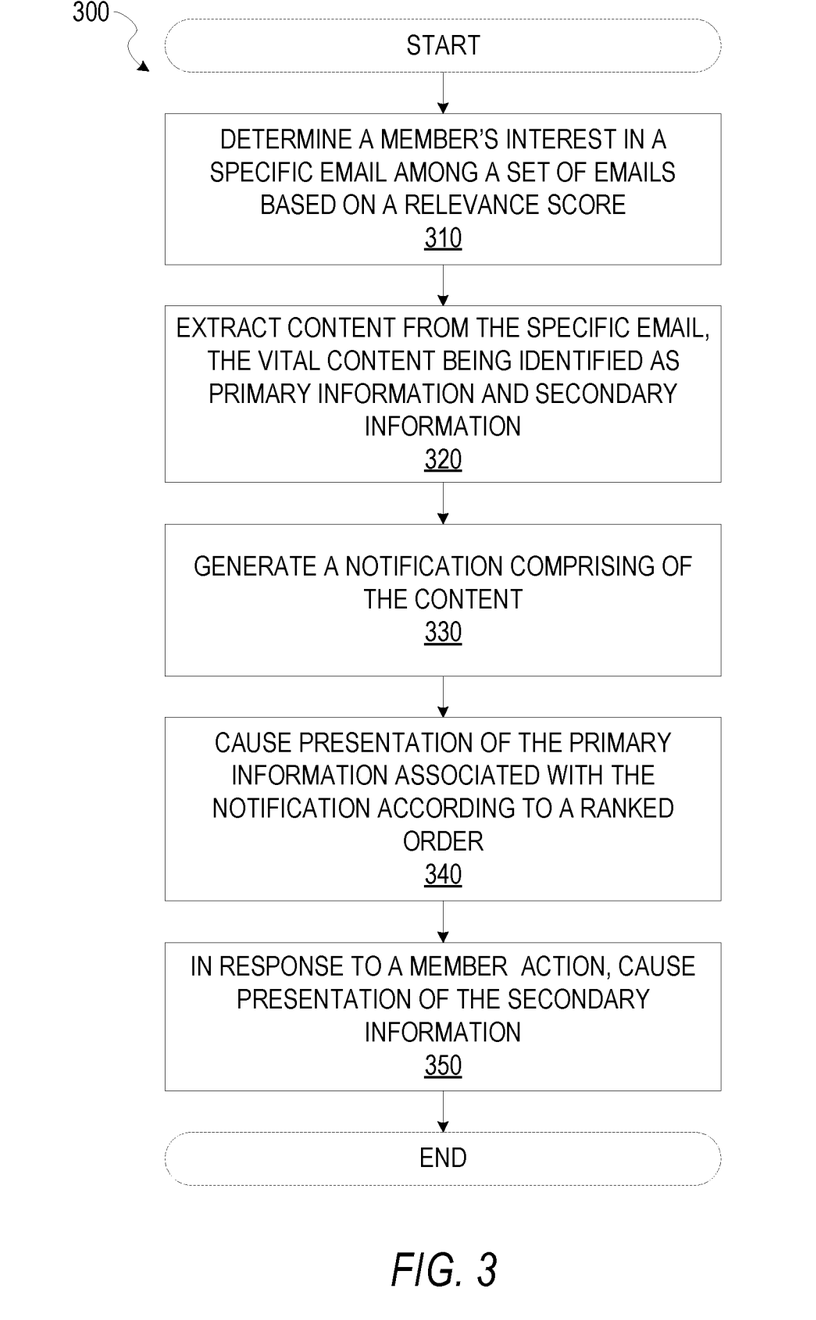
FIG. 3 is a flow diagram illustrating an example method for generating and routing notifications of extracted email content, according to some example embodiments.

FIG. 3 is a flow diagram illustrating an example method 300 for generating a new notification for associated important emails from a plurality of incoming emails, where the important emails are unique to each member according to their member profile and member activity, according to example embodiments. The operations of the method 300 may be performed by components of the routing system 200. At operation 310, the scoring module 230 determines a member's interest for specific emails among a set of emails based on a member profile information and member activities. From among the set of emails, some are of potential importance to the member while other emails are not. The scoring module 230 determines certain emails are of interest to the member being based on a relevance score transgressing a threshold, the relevance score being calculated based on a relevance ranking using vector space model comparison between each email within the set of emails and the member profile. The scoring module 230 calculated the relative importance of content within each email among the set of emails compared with the content within the member's profile information and past activities, where the scoring module 230 assigns a relevance score to each email based on the comparison. Each email is represented as vectors in a multi-dimensional common vector space, referred to as the vector space model. Each word term is assigned a weight using term frequency-inverse document frequency (tf-idf) term weighting method to determine the importance of a word within a document in a collection of documents. Tf refers to term frequency where it indicates how often the term occurs within the document. Idf refers to document frequency where it indicates how many documents does the term occur. A tf-idf weight expresses the term's importance for a particular document. A high tf-idf weight is assigned to a term if it occurs frequently in the document but occurs with less frequency within the whole set of documents, that is between documents. On the other hand, a term that occurs frequently in all documents would have a low tf-idf weight since the term has low discrimination power. Such terms with low tf-idf weight can be in the form of conjunction words (e.g., and, but if, or), and the like. It is noted that word term includes a single-word term or a multi-word term, a single-word term can be in the example form of a single word such as "engineer" and a multi-word term can be in example form of multiple words such as "software engineer". It is further noted that the term documents is in the example form of emails, member profile information, or any web page that include word terms.

The tf-idf value is used to generate a vector representation for each document email and document member profile. Each component of a vector corresponds to tf-idf value associated with a specific word term. The set of documents are represented by a set of vectors in the vector space, where there is one axis for each word term. Further, the member's profile information and past activities are also represented as vectors in the common vector space. The better the match between the content of the emails and the member's profile information, the higher the relevance score. The similarities between each email and the member's profile information and past activities are determined based on the magnitude of the vector difference between the corresponding vectors of the email, member profile, and past activities. The comparison between the vectors are computed using cosine similarity of their vector representation, the cosine similarity being a value that can be assigned to the documents for ranking the similarity and thus relevance. Past activities are represented by the corresponding documents that the member interacted with in the past, the document being used as a comparison to the incoming emails to determine relevance. For example, a past activity include the user searching, clicking, and leaving an endorsement on a member profile of a colleague. The member profile of the colleague is used for comparison as a representation of the past activity of the user. Within the set of emails, each represented by a vector, the scoring module 230 calculates the relevance score for each email among the set of emails as compared to the member's profile information and past activities. The set of emails are ranked according to their relevance score, where the emails with a relevance score transgressing a predetermine threshold being determined as important and therefore of interest to the member.

In some embodiments, the determining certain emails are of potential interest being based on member profile information. In an example, within the member's email inbox, a plurality of emails varies from promotions, unfiltered spam, emails from other members, regular updates being sent about the activities of other members within a user's network, emails from recruiters, and the like. Where the member indicates within their member profile that they are seeking for opportunities as a sales manager, then recruiting emails with a job title as sales manager would result in a high relevance score, and thus be marked as important and thus of interest to the particular member. It is noted that this same recruiting email with the job title as sales managers would not have a high relevance score for different members that do not indicate within their member profile they are seeking for such a job or have any past employment history associated with sales or management.

In some embodiments, member activities comprise of the member indicating interest in certain emails and not others. For instance, the member can indicate interest mainly by clicking on recruiting emails where the job position is at a specific company such as LinkedIn while not clicking on recruiting emails for positions at other companies. The trend in the way the member indicates interest shows that the member is interested in working at the company LinkedIn. In other instances, the member indicates interests mainly in recruiting emails where the job position has a title of Senior Software Engineer and ignores recruiting emails for Junior Software Engineers. In this instance, the trend indicates the member is indicating interest in a Senior Software Engineering position. These trends are calculated based on matches in job location, company name, job title, seniority level, industry, job function, skill set, recruiter name, and so forth, between the emails that the member indicates interest. In addition to looking at member email activities, user activities associated with searching and clicking on specific member profiles are also used to determine member interest. For instance, the member clicks on member profiles who are employees at a specific company such as LinkedIn. The number of member profiles who are employees at LinkedIn measured above a threshold amount indicates the member interest with the company LinkedIn. Member activities comprise of past and present member activities.

In various embodiments, at operation 320, the extraction module 240 extracts vital content from the specific email that has a relevance score above a predetermined threshold. The vital content may be identified by the extraction module 240 as primary information or secondary information. Primary information is predetermined and indicate that the information is of primary importance to the user when compared to secondary information of the email content. The vital content that is extracted is dependent on the classification of the email, the classification including recruiting emails (e.g., emails sent by recruiters to individual members), endorsement emails (e.g., emails notifying a member that another member has endorsed them), and the like. The classification is indicated within the metadata associated with the email and stored and accessed by the data module 220. In an example, for recruiting emails, the extraction module 240 extracts and identify the content as hiring company name, job location, job title, job seniority level, recruiter name, industry associated with the job (e.g., computer software, law, medicine, real estate, and the like), the relevance score determined by the scoring module 230, job function (e.g., sales, software engineer, hardware engineer, attorney, and the like), skill set required and preferred (e.g., Java, C++, Python, and the like), years of experience required, and the like. The extraction module 240 identifies that Java is a skill set by matching the words within the recruiting email with words within the database 128, which associated Java as a skill set, engineer as a job function, law as an industry, and the like. The extraction module 230 identifies content as primary information or secondary information based on its predetermined importance as indicated within the database 128. For instance, for recruiting emails, the primary information can include the corporation name, job title, job location, and relevance score. The secondary information can include the skill set, recruiter name, and years of experience required. In some embodiments, all predetermined primary information are required, and therefore is not identified within the email, the extraction module 240 does not continue on to generating the notification. In this embodiment, each classification (e.g., recruitment emails, endorsement emails, etc.) have differing required primary information. As a result, primary important information may be predetermined by the existence of specific types of information as described above, the specific type being set by operators of the system. In general, the predetermination of primary importance hinges on the bare minimum amount of information to give to the member in order for the member to be engaged. Therefore, where the member does not engage with the predetermined set of primary important information, the type of information that is considered primary important may change according to the level of member engagement. In another example, the extracted content consists of the name of the sender, the subject of the email, and the first few lines from the first paragraph of the email body.

In various embodiments, at operation 330, the extraction module 240 generates a notification comprising of the vital content. The vital content, including the primary information and the secondary information are extracted from the email and subsequently each content is placed into a notification with designated locations for each of the primary information and secondary information. Further details associated with the generation of the notification of the primary information and the secondary information are further described in association with FIG. 5 and FIG. 6.

In various embodiments, at operation 340, the presentation module 250 causes presentation of the primary information associated with the notification according to a ranked order, the ranked order being based on the relevance score. Each notification has an associated relevance score indicating how relevant the information is considered to be for the member using the member's profile information and activities. The higher the relevance score, the higher the notification is ranked. Further details associated with the presentation of the primary information associated with the notification according to a ranked order are further described in association with FIG. 5 and FIG. 6.

In response to a member action, the presentation module 250 causes presentation of the secondary information. In some embodiments, the primary information associated with the notification is first presented, while the secondary information is hidden and would surface in response to a member action. The member action can include the member hovering a mouse over the notification, clicking the notification, creating a tapping/dragging motion over the notification, or other interactions available at the user device to indicate interest. In response to such an action, the secondary information is presented in addition to the primary information. The member may also indicate an intent to view the email associated with the notification for further details. In response to such an action, the presentation module 250 routes the presented information from the notification directly to the email within the email inbox of the member. Further details associated with the presentation of the secondary information associated with the notification are further described in association with FIG. 5 and FIG. 6.

Figure 4:
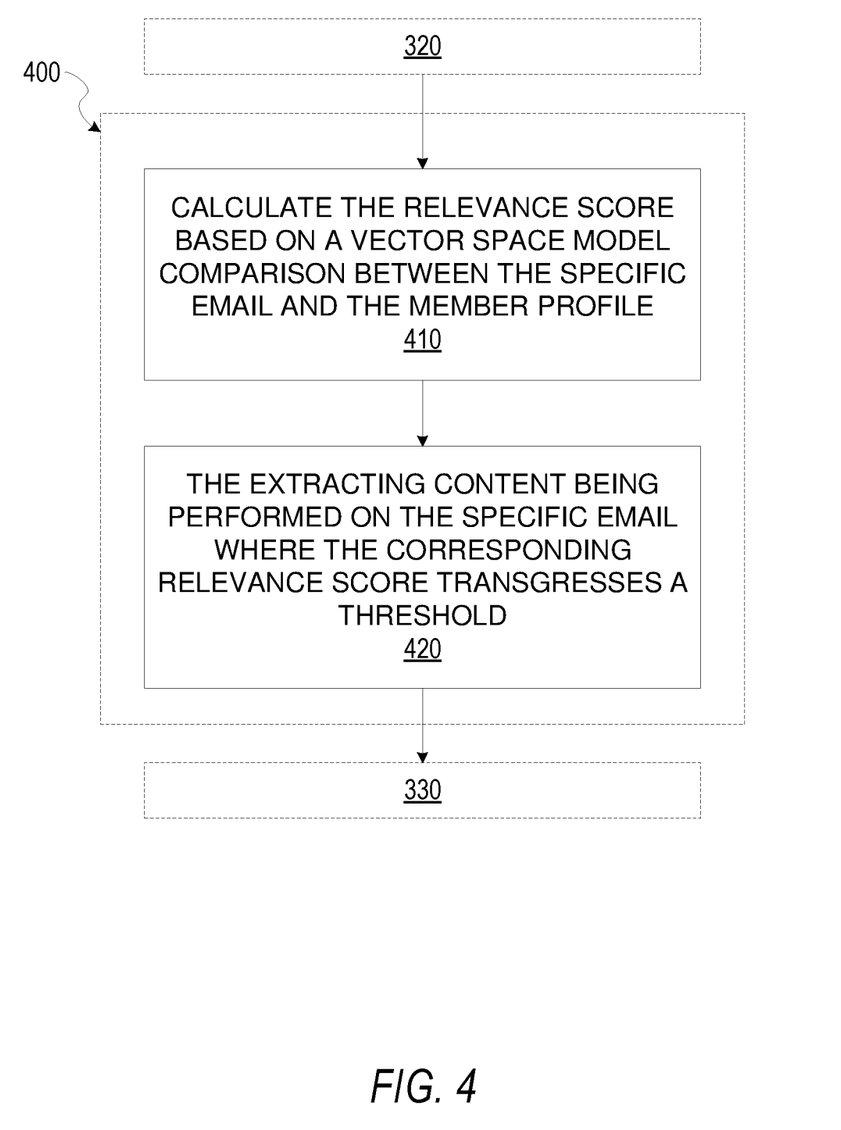
FIG. 4 is a flow diagram illustrating an example method for calculating a relevance score of specific emails, according to some example embodiments.

FIG. 4 is a flow diagram illustrating an example method 400 for calculating a relevance score of specific emails, according to example embodiments. The operations of the method 400 may be performed by components of the routing system 200. At operation 410, the scoring module 230 calculates the relevance score based on a cosine similarity measure of the vector space model comparison between the specific email and the member profile, as discussed in detail above. In other embodiments, the scoring module 230 calculates the relevance score based on a cosine similarity score of the vector space model comparison between the specific email and the member's past activities, the member's past activities including the content of the emails that the user has clicked and viewed, the content of other member profiles that the user has viewed above a specific number of times, and the like. Each of the content of these documents (e.g., email, member profiles, etc) being represented in vectors space as fully disused in detail above. From the comparison, the greater the match between the content of the email and the member profile, the higher the relevance score. For instance, in a recruiting email, where the job title, seniority, and skill set are matched with the member profile, the relevance score is high.

At operation 420, the content of the email is only extracted to create a notification where the corresponding relevance score transgresses a threshold. In other words, where the match between the content of the email and the member profile is higher than a predetermined threshold, then the content of the email would be extracted to create a notification. Where the relevance score is too low, the email is not as of interest to the user, and therefore not routed to the notification channel to directly notify the user.

Figure 5:
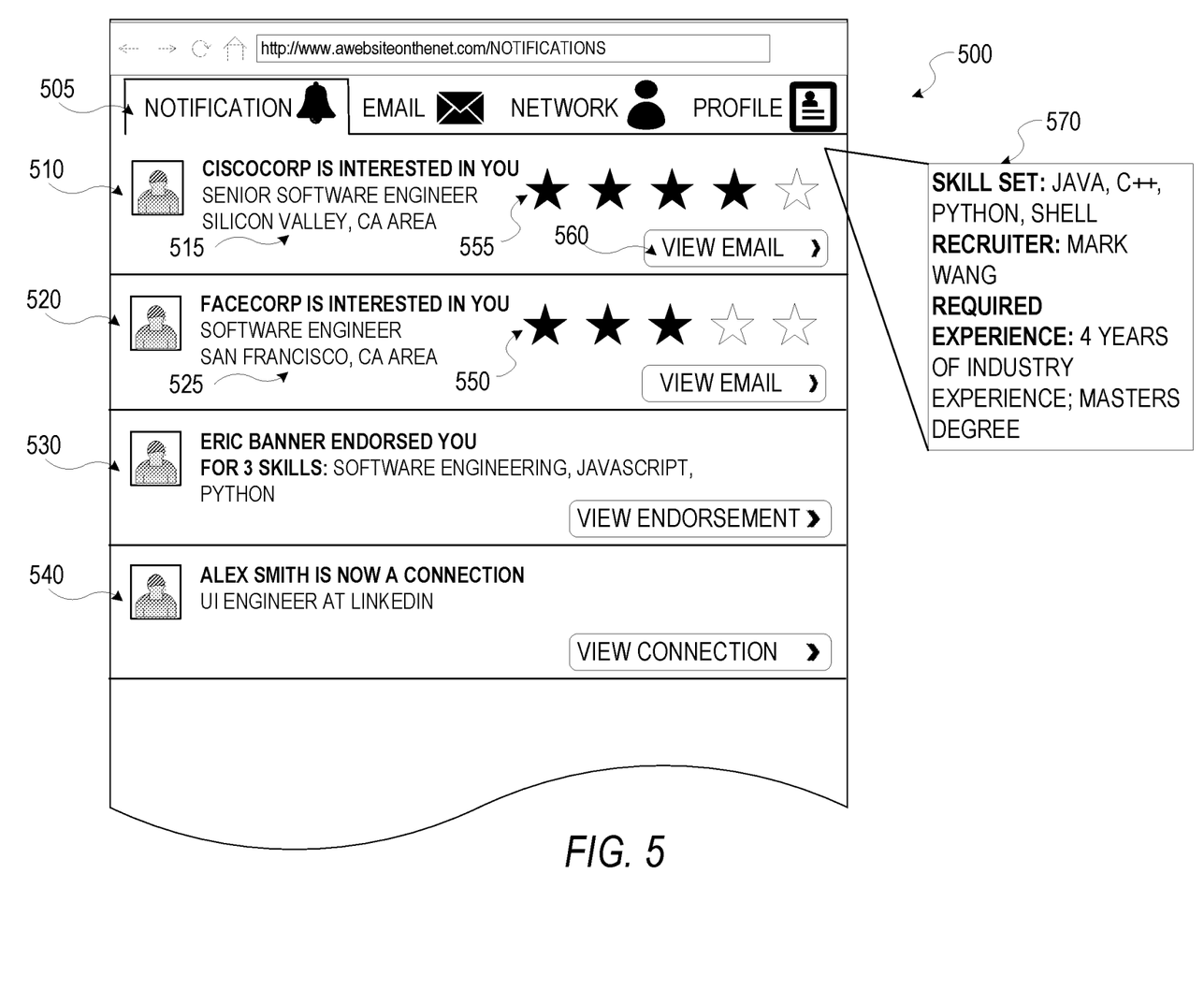
FIG. 5 is an example user interface for interactively presenting the generated notification, according to a ranked order, according to some example embodiments.

FIG. 5 depicts an example user interface 500 for interactively presenting the generated notification, according to a ranked order. When a member signs into their member profile, the notification tab 505 may indicate that the member has new notifications. In clicking on the notification tab 505, the ranked order of the notifications is caused to be presented to the member at a user interface of a user device. The notifications may include the notification comprising the vital content 510 and 520, and primary content 515 and 525, the vital content being generated from extracted important email content, and other notifications including endorsement 530 and new connection 540, and so forth. The notifications 510 and 520 are ranked according to their relevance score, visually represented by corresponding stars 555 and 550. In other words, notification 510 indicates CiscoCorp is interested in the member has a corresponding relevance score of 4 out of 5, while notification 520 indicates FaceCorp is interested in recruiting the member and the notification has a relevance score of 3 out of 5. In some situations, the notifications ranking are different from the ranking in which the emails corresponding to notifications 510 and 520, which typically tend to be ranked according to the time in which the email was sent. In other words, notification 510 may be ranked ranker than notification 520 due to a higher relevance score, but notification 510 may be sent at an earlier time (e.g., sent Jan. 2, 2016) when compared to notification 520 (e.g., sent Jan. 15, 2016). In other embodiments, the user is able to indicate the order in which the notifications are presented, such as date received, as an example.

In other embodiments, in response to a member action, the presentation module 250 causes presentation of the secondary information. The member action includes the member hovering a mouse over the notification region 510, or clicking or tapping on the notification region 510. In response, the secondary information 570 is presented at the user interface. In some instances, the secondary information 570 is not shown in the notification region 510 due to limited screen space, which is especially important in mobile devices with smaller screen space. As a result, more important information is first shown (e.g., primary information), and where the user indicates further interest, the secondary information is shown. Where the member is interested in further information associated with the notification, the member may select selectable interface 560, which routes the user to the email corresponding to the notification 510 within the member's email inbox.

Figure 6:
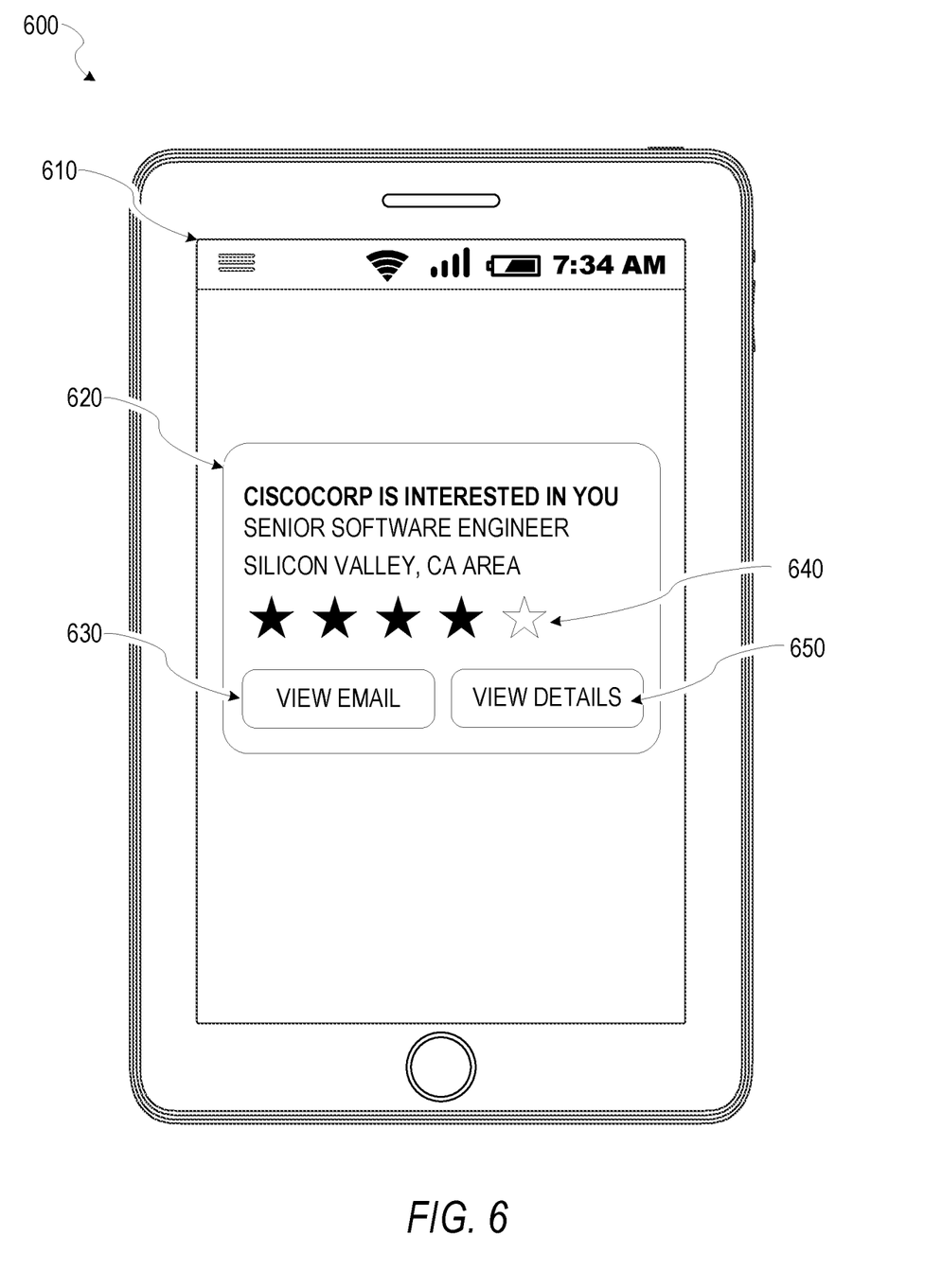
FIG. 6 is an example device displaying an example user interface for interactively presenting the generated notification, according to some example embodiments.

FIG. 6 depicts an example device 600 (e.g., a mobile device) displaying an example user interface 610 for interactively presenting notification 620, according to some example embodiments. In various embodiments, the presentation module 250 causes presentation of the notification 620 to the member via user interface 610. For instance, the presentation module 250 communicates, to the device 600, instructions to present the notification 620 with selectable element 630 and 650. The notification 620 includes primary information extracted from important emails with the relevance score 640, represented visually by star ratings, according to some embodiments. In example embodiments, the notification 620 comprises a text message being sent through text messaging channels such as SMS messages, MMS, EMS, and so forth. In other example embodiments, the notification 620 is sent using a push notification or another similar type of notification. In an example, the notification 620 is presented to the member in the form of a push notification based on the determination by the scoring module 230 that the notification transgresses a predetermined relevance threshold. In some embodiments, the notification 620 is sent directly to the member's mobile device, without need for the member to sign-in to the member profile, where the relevance score is high, such scoring a 4 out of 5 or above. The member can select selectable element 650, to surface the secondary information as shown in element 570, FIG. 5. Further, the member can select selectable element 630 to be routed to the email inbox of the member and directly to the email associated with the notification 620.

Modules, Components, and Logic

Figure 7:
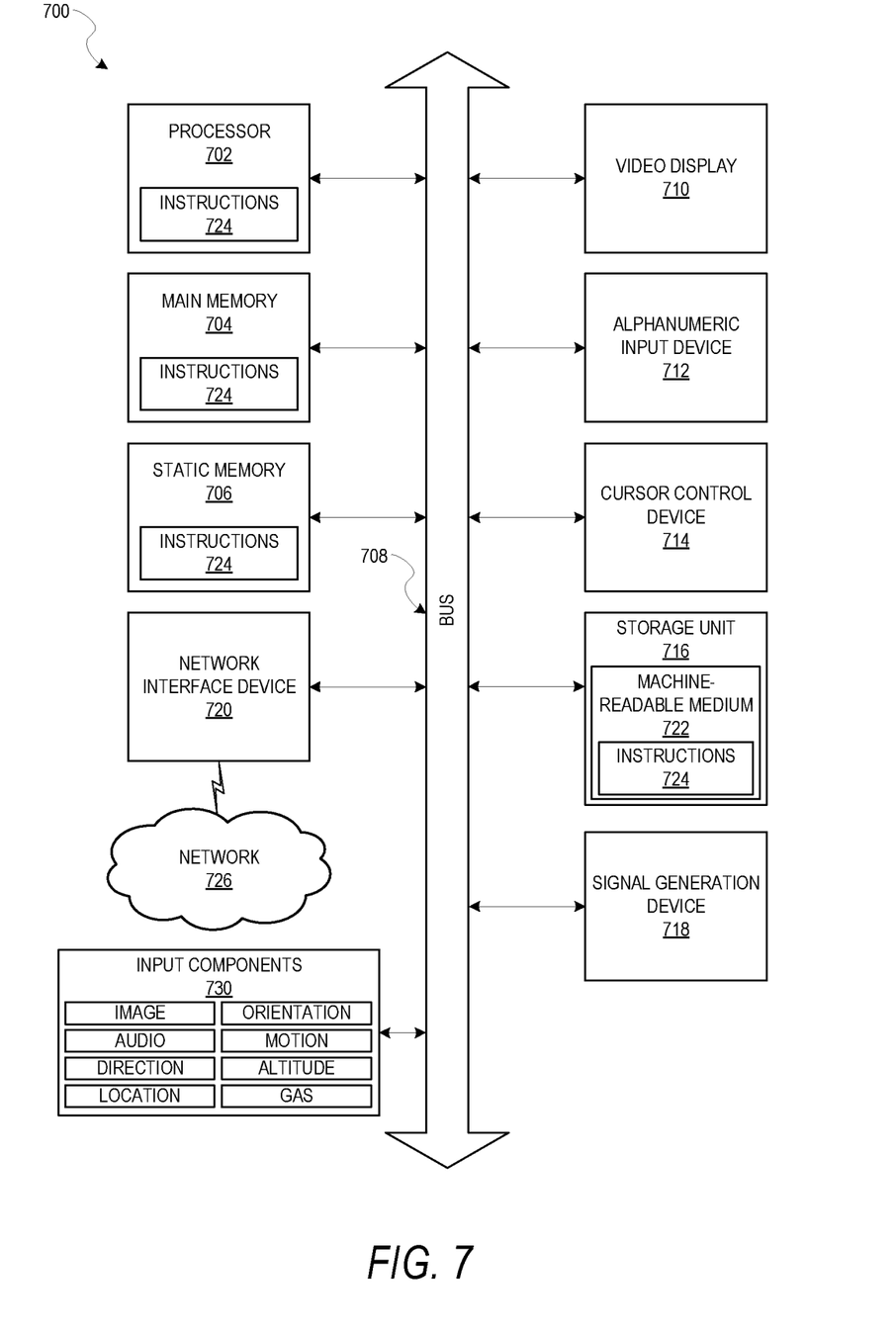
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 724 (e.g., software, a program, an application, an applet, an app, or other executable code) for causing the machine 700 to perform any one or more of the methodologies, associated with the routing system 200, discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Any of these machines can execute the operations associated with the routing system 200. Further, while only a single machine 700 is illustrated, the term "machine" shall also be taken to include a collection of machines 700 that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the static memory 706, within the processor 702 (e.g., within the processor's cache memory), or all three, during execution thereof by the machine 700. Accordingly, the main memory 704, static memory 706 and the processor 702 may be considered as machine-readable media 722. The instructions 724 may be transmitted or received over a network 726 via the network interface device 720.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions (e.g., instruction 724) for execution by a machine (e.g., machine 700), such that the instructions, when executed by one or more processors of the machine 700 (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 722 is non-transitory in that it does not embody a propagating signal. However, labeling the machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

The instructions 724 may further be transmitted or received over a communications network 726 using a transmission medium via the network interface device 720 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., Wi-Fi and BlueTooth networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, with a processor 702 being an example of hardware. For example, at least some of the operations of a method may be performed by one or more processors 702 or processor-implemented modules. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via the network 726 (e.g., the Internet) and via one or more appropriate interfaces (e.g., an application program interface (API)).

The performance of certain of the operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor, and a memory including instructions, which when executed by the processor, cause the processor to:
determine a member's interest in a specific email among a set of emails based on a relevance score;
extract content from the specific email, the content including a subject of the specific email, a name of a sender of the specific email, and at least a first plurality of lines in a body of the specific email, each piece of the extracted content being identified as either primary information or secondary information, wherein the primary information includes at least some content from the at least a first plurality of lines in the body of the specific email, the primary information identified based on a predetermined indication, stored within a database, that a first type of information associated with the primary information is more important than a second type of information associated with the secondary information;
generate a notification comprising vital content extracted from the specific email, the vital content comprising information from the primary information;
cause presentation, in a graphical user interface, of the primary information associated with the notification according to a ranked order, the ranked order being based on the relevance score;
cause presentation of a first user interface element in the graphical user interface, the first user interface element designed such that when a user performs a hovering action, in the graphical user interface, in a layer over a layer containing the first user interface element, without completely obscuring the first user interface element, the graphical user interface automatically renders the secondary information, the secondary information not including any of the primary information; and
cause presentation of a second user interface element in the graphical user interface, the second user interface element designed such that when a user performs a selection action, in the graphical user interface, of the second user interface element, the graphical user interface automatically renders the specific email.

2. The system of claim 1, further comprising:
calculate the relevance score based on a vector space model comparison between the specific email and the member profile.

3. The system of claim 1, further comprising:
calculate the relevance score based on a vector space model comparison between the specific email and past activities of the member.

4. The system of claim 3, wherein:
the past activities of the member include emails that the user has indicated interest in.

5. The system of claim 1, further comprising:
in response to a second member action initiated by the member, route the member directly to the email associated with the notification within the member email inbox.

6. The system of claim 1, wherein:
the extracting content being performed on the specific email where the corresponding relevance score transgresses a threshold.

7. The system of claim 1, wherein:
the specific email comprises of all predetermined primary information that are required for the generated notification.

8. A method comprising: using one or more computer processors: determining a member's interest in a specific email among a set of emails based on a relevance score; extracting content from the specific email, the content including a subject of the specific email, a name of a sender of the specific email, and at least a first plurality of lines in a body of the specific email, each piece of the extracted content being identified as either primary information or secondary information, wherein the primary information includes at least some content from the at least a first plurality of lines in the body of the specific email, the primary information identified based on a predetermined indication, stored within a database, that a first type of information associated with the primary information is more important than a second type of information associated with the secondary information; generating a notification comprising vital content extracted from the specific email, the vital content comprising information from the primary information; causing presentation, in a graphical user interface, of the primary information associated with the notification according to a ranked order, the ranked order being based on the relevance score; causing presentation of a first user interface element in the graphical user interface, the first user interface element designed such that when a user performs a hovering action, in the graphical user interface, in a layer over a layer containing the first user interface element, without completely obscuring the first user interface element, the graphical user interface automatically renders the secondary information, the secondary information not including any of the primary information; and causing presentation of a second user interface element in the graphical user interface, the second user interface element designed such that when a user performs a selection action, in the graphical user interface, of the second user interface element, the graphical user interface automatically renders the specific email.

9. The method of claim 8, further comprising:
calculating the relevance score based on a vector space model comparison between the specific email and the member profile.

10. The method of claim 8, further comprising:
calculating the relevance score based on a vector space model comparison between the specific email and past activities of the member.

11. The method of claim 10, wherein:
the past activities of the member include emails that the user has indicated interest in.

12. The method of claim 8, further comprising:
in response to a second member action initiated by the member, routing the member directly to the email associated with the notification within the member email inbox.

13. The method of claim 8, wherein:
the extracting content being performed on the specific email where the corresponding relevance score transgresses a threshold.

14. The method of claim 8, wherein:
the specific email comprises all predetermined primary information that are required for the generated notification.

15. A machine-readable medium not having any transitory signals and storing instructions that, when executed by at least one processor of a machine, cause the machine to perform operations comprising:
determining a member's interest in a specific email among a set of emails based on a relevance score;
extracting content from the specific email, the content including a subject of the specific email, a name of a sender of the specific email, and at least a first plurality of lines in a body of the specific email, each piece of the extracted content being identified as either primary information or secondary information, wherein the primary information includes at least some content from the at least a first plurality of lines in the body of the specific email, the primary information identified based on a predetermined indication, stored within a database, that a first type of information associated with the primary information is more important than a second type of information associated with the secondary information;
generating a notification comprising vital content extracted from the specific email, the vital content comprising information from the primary information;
causing presentation, in a graphical user interface, of the primary information associated with the notification according to a ranked order, the ranked order being based on the relevance score;
causing presentation of a first user interface element in the graphical user interface, the first user interface element designed such that when a user performs a hovering action, in the graphical user interface, in a layer over a layer containing the first user interface element, without completely obscuring the first user interface element, the graphical user interface automatically renders the secondary information, the secondary information not including any of the primary information; and
causing presentation of a second user interface element in the graphical user interface, the second user interface element designed such that when a user performs a selection action, in the graphical user interface, of the second user interface element, the graphical user interface automatically renders the specific email.

16. The machine-readable medium of claim 15, wherein the operations further comprise:
calculating the relevance score based on a vector space model comparison between the specific email and the member profile.

17. The machine-readable medium of claim 15, wherein the operations further comprise:
calculating the relevance score based on a vector space model comparison between the specific email and past activities of the member.

18. The machine-readable medium of claim 17, wherein:
the past activities of the member include emails that the user has indicated interest in.

19. The machine-readable medium of claim 15, wherein the operations further comprise:
in response to a second member action initiated by the member, routing the member directly to the email associated with the notification within the member email inbox.

20. The machine-readable medium of claim 15, wherein the operations further comprise:
the extracting content being performed on the specific email where the corresponding relevance score transgresses a threshold.

* * * * *